P. S. WATTS.
TOOL RACK.
APPLICATION FILED MAY 24, 1916.
1,231,316.
Patented June 26, 1917.
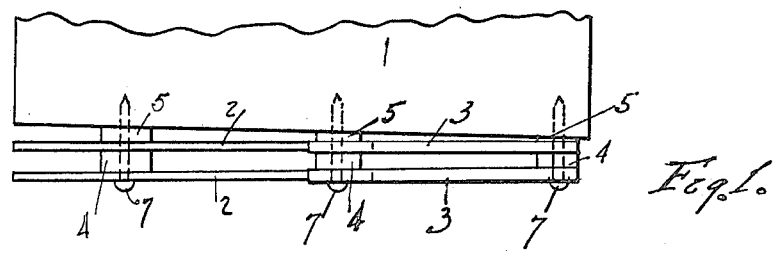
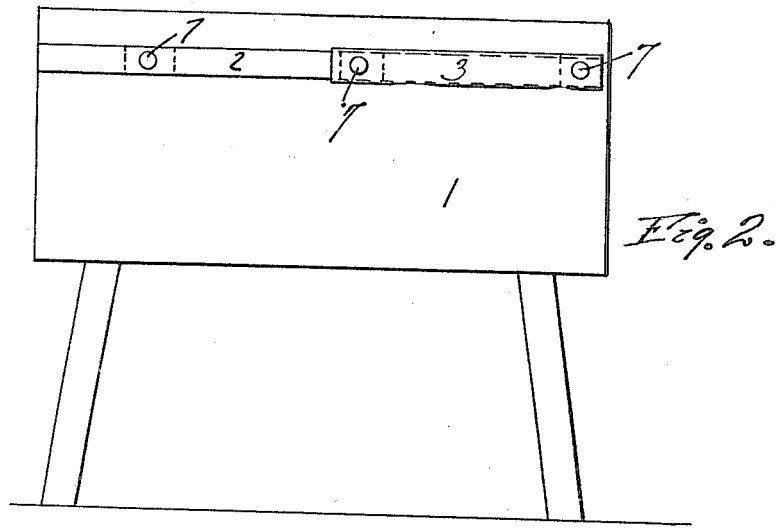
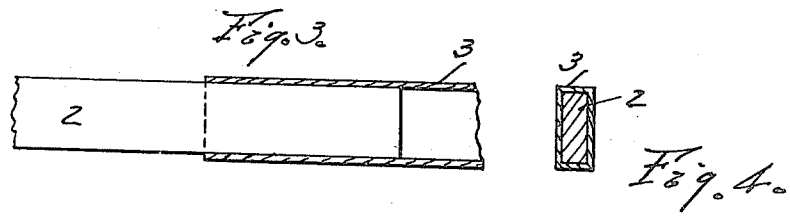
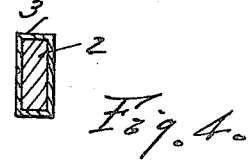
WITNESS
Frank H. Fowler.
INVENTOR
Percy Stanley Watts
BY
ATTORNEY

UNITED STATES PATENT OFFICE.

PERCY STANLEY WATTS, OF SEATTLE, WASHINGTON.

TOOL-RACK.

1,231,316.  Specification of Letters Patent.  Patented June 26, 1917.

Application filed May 24, 1916. Serial No. 99,610.

*To all whom it may concern:*

Be it known that I, PERCY STANLEY WATTS, a citizen of the United States, and a resident of Seattle, in the county of King and State of Washington, have invented certain new and useful Improvements in Tool-Racks, and has for its principal object to provide a novel and improved form of tool-rack which is attachable to butcher-blocks and the like and within which the journeyman butcher may place his tools—such as knives, cleavers, saws, and the like. Another object of this device is to provide a rack of the above general description which is easily removable from a butcher-block, so that the butcher may telescope it and carry it with him when he moves from shop to shop. As each particular butcher generally has his own tools, which are peculiarly adapted to his use, it is desirable that he have an individual rack made particularly for the tools which he employs himself. Therefore the removable and easily portable rack is desirable.

Other objects will appear as my invention is more fully explained in the following specification, illustrated in the accompanying drawings, and pointed out in the appended claims:

In the drawings Figure 1 is a fragmentary plan of a block with my device shown attached thereto. Fig. 2 is a side elevation of same. Fig. 3 is a detail sectional elevation of my rack shown, somewhat enlarged. Fig. 4 is a cross sectional view of same.

Referring more particularly to the drawings, numeral 1 indicates a butcher block which may be either square or round. Numeral 2 indicates rack members preferably flat and oblong in cross section, and which are slidable within other rack members, 3. The rack members 2 and 3 are parallel, and are held in spaced relationship by means of blocks 4, tapered wedge-blocks 5 of different thicknesses are provided on the inner side of the tool rack and are in line with the blocks 4. The blocks 4 and 5 may be secured to the rack members 2 and 3 in any desirable manner or may be loose therewith. Any suitable means of fastening such as a screw 7, may be used to secure the rack to the block. It will be further noted that the blocks 4 and 5 on one end of the rack are spaced somewhat back from the end of the rack members 2 so as to leave a space within which saws may be kept. It will be understood that when my rack is removed from the block that the members 2 telescope within the member 3 so as to shorten the length of the rack in order that it may be carried in a case or satchel. My rack may be made straight as shown or may be made in a circular form to fit a round block, and I desire that this application should suit both forms.

While I have shown a particular form of embodiment of my invention, I am aware that many minor changes therein will readily suggest themselves to others skilled in the art without departing from the spirit and scope of the invention, and I therefore desire to avoid being limited to the exact claims.

Having described my invention, what I claim as new and desire to protect by Letters Patent, is—

1. In a tool rack for butcher blocks, the combination of pairs of rack members slidably secured together and arranged in parallel and spaced relation with each other, tapering blocks of different thicknesses arranged progressively as to thickness and secured to one side of said rack members, the said blocks being removably attachable to a butcher's block, whereby a convenient and easily portable rack for butchers' tools is provided.

2. The combination of a portable tool rack adapted to hold butchers' tools, said rack including parallel pairs of rack members slidably secured together, the said pairs being secured in spaced relation with each other and in tapering relation to a butcher block.

PERCY STANLEY WATTS.

Copies of this patent may be obtained for five cents each, by addressing the "Commissioner of Patents, Washington, D. C."